(12) United States Patent
Kelley, III et al.

(10) Patent No.: US 6,217,686 B1
(45) Date of Patent: Apr. 17, 2001

(54) ULTRASOUND WELDING APPARATUS

(75) Inventors: Andrew Kelley, III, Somerville; Peter T. Lee, Cambridge, both of MA (US)

(73) Assignee: Virtual Ink Corp., Boston, MA (US)

( * ) Notice: Subject to any disclaimer, the term of this patent is extended or adjusted under 35 U.S.C. 154(b) by 0 days.

(21) Appl. No.: 09/340,747

(22) Filed: Jun. 28, 1999

(51) Int. Cl.$^7$ .................................................. B32B 31/16
(52) U.S. Cl. ...................................... 156/73.1; 156/580.2
(58) Field of Search ............................... 156/73.1, 580.1, 156/580.2, 73.2, 73.4; 264/442, 443, 445; 425/174.2; 228/1.1, 110.1

(56) References Cited

U.S. PATENT DOCUMENTS

| | | | |
|---|---|---|---|
| 3,955,740 | 5/1976 | Shoh | 228/1 |
| 4,123,312 | 10/1978 | Schmid et al. | 156/466 |
| 4,333,791 | 6/1982 | Onishi | 156/580.1 |
| 4,366,016 | 12/1982 | Golden, Jr. | 156/218 |
| 4,959,109 | 9/1990 | Swain et al. | 156/73.4 |
| 4,975,133 | 12/1990 | Gochermann | 156/73.1 |
| 5,205,807 | 4/1993 | Adams, Jr. et al. | 493/125 |
| 6,059,923 | * 5/2000 | Gopalakrishna | 156/580.2 |
| 6,149,755 | * 11/2000 | McNichols et al. | 156/264 |
| 6,165,298 | * 5/2000 | Samida et al. | 156/73.1 |

FOREIGN PATENT DOCUMENTS 0 409 021 A2   1/1991   (EP) .............................. B29C/53/50

* cited by examiner

Primary Examiner—James Sells
(74) Attorney, Agent, or Firm—David J. Weitz; Wilson Sonsini Goodrich & Rosati

(57) ABSTRACT

An ultrasound welding component is disclosed. One embodiment of the component includes a weld region about which an ultrasound weldable material may be wrapped. The weld region includes a weld zone consisting of recesses positioned on opposing sides of a weld area. The recesses and weld area each having widths selected such that an ultrasound source compressing overlapping sections of the ultrasound weldable material against the weld area forms a weld having a width which is narrower than a sum of the widths of the recesses and the weld area. The component also includes a mechanism which immobilizes the ultrasound weldable material relative to the weld zone.

37 Claims, 11 Drawing Sheets

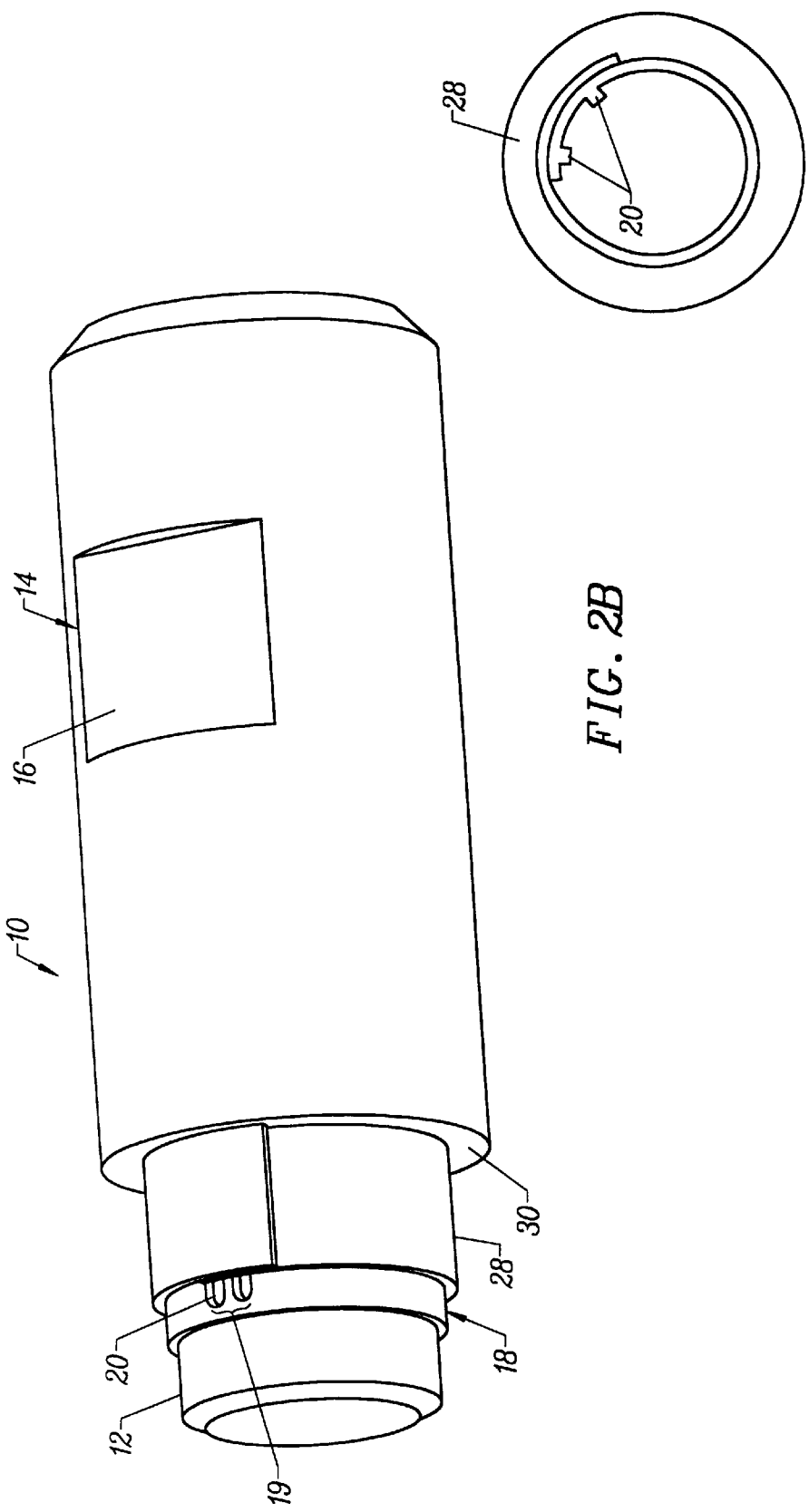

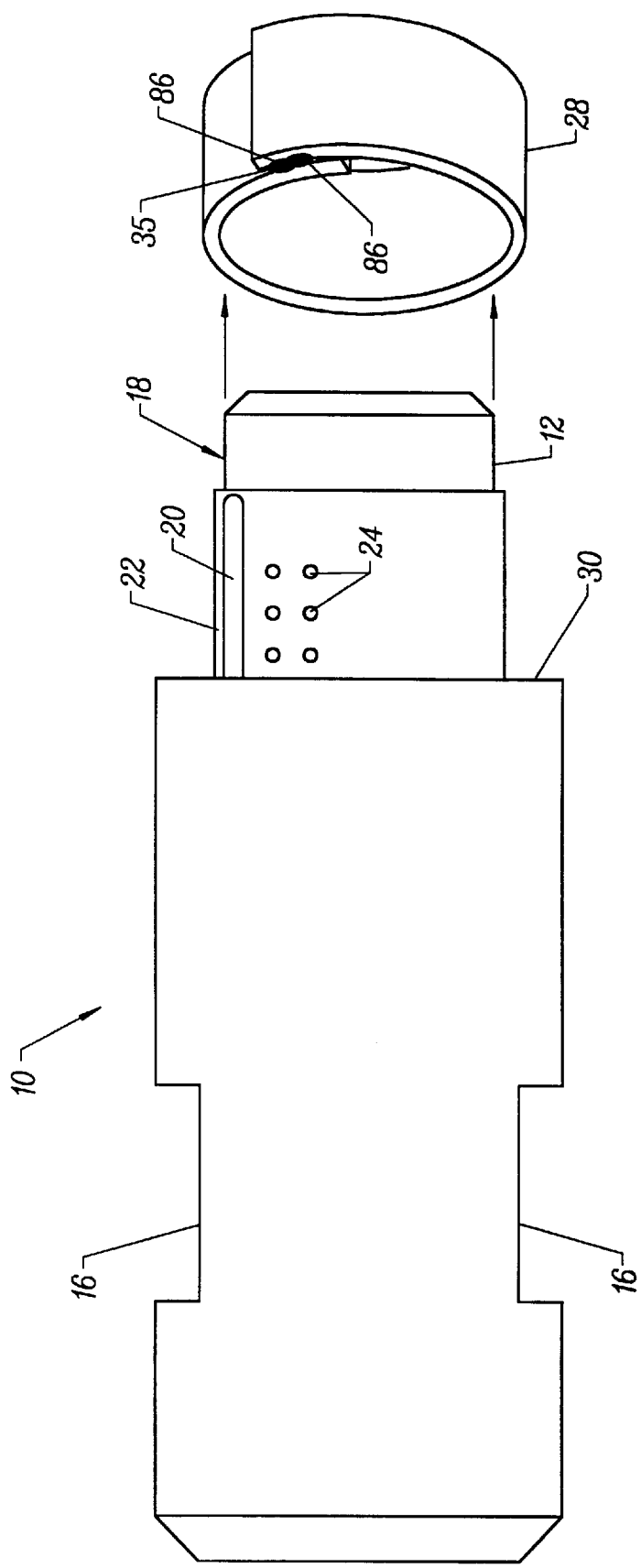

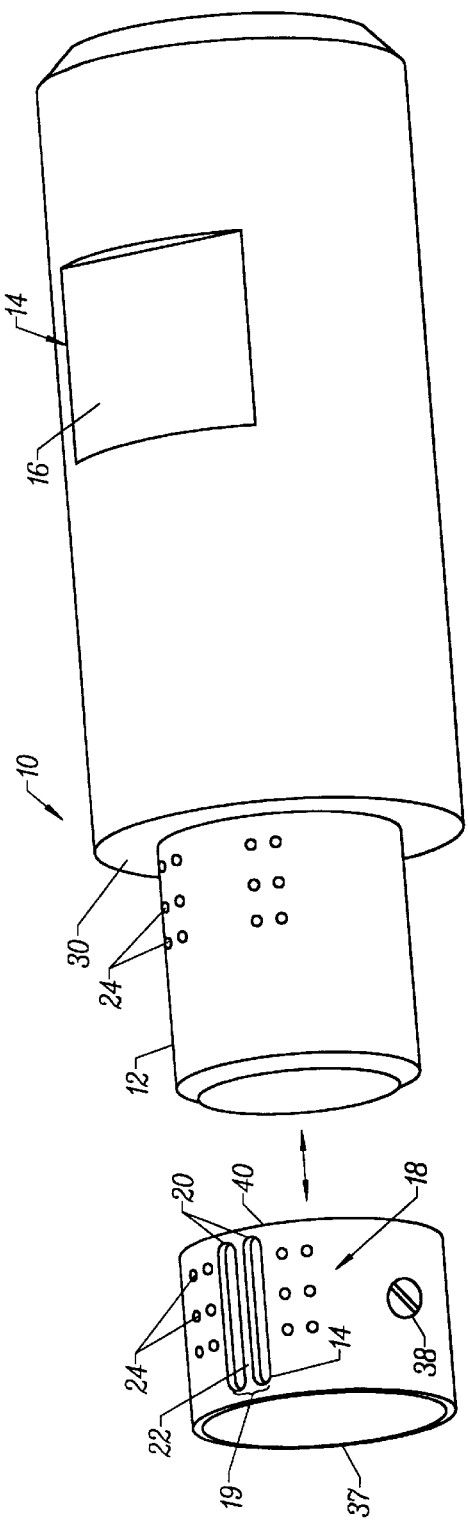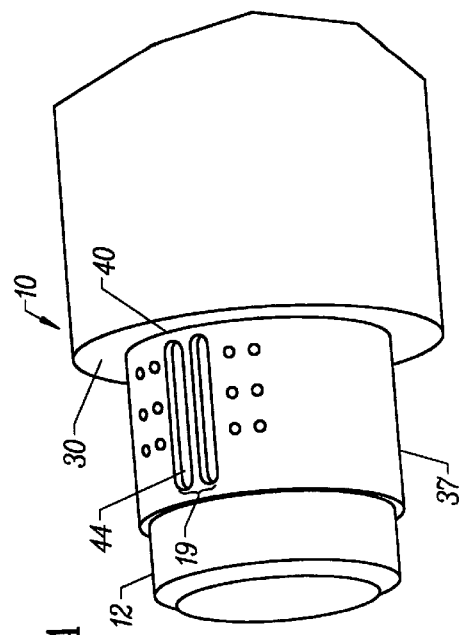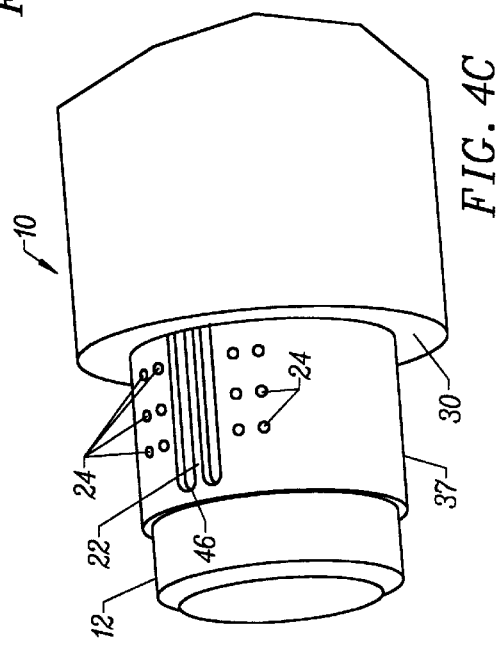

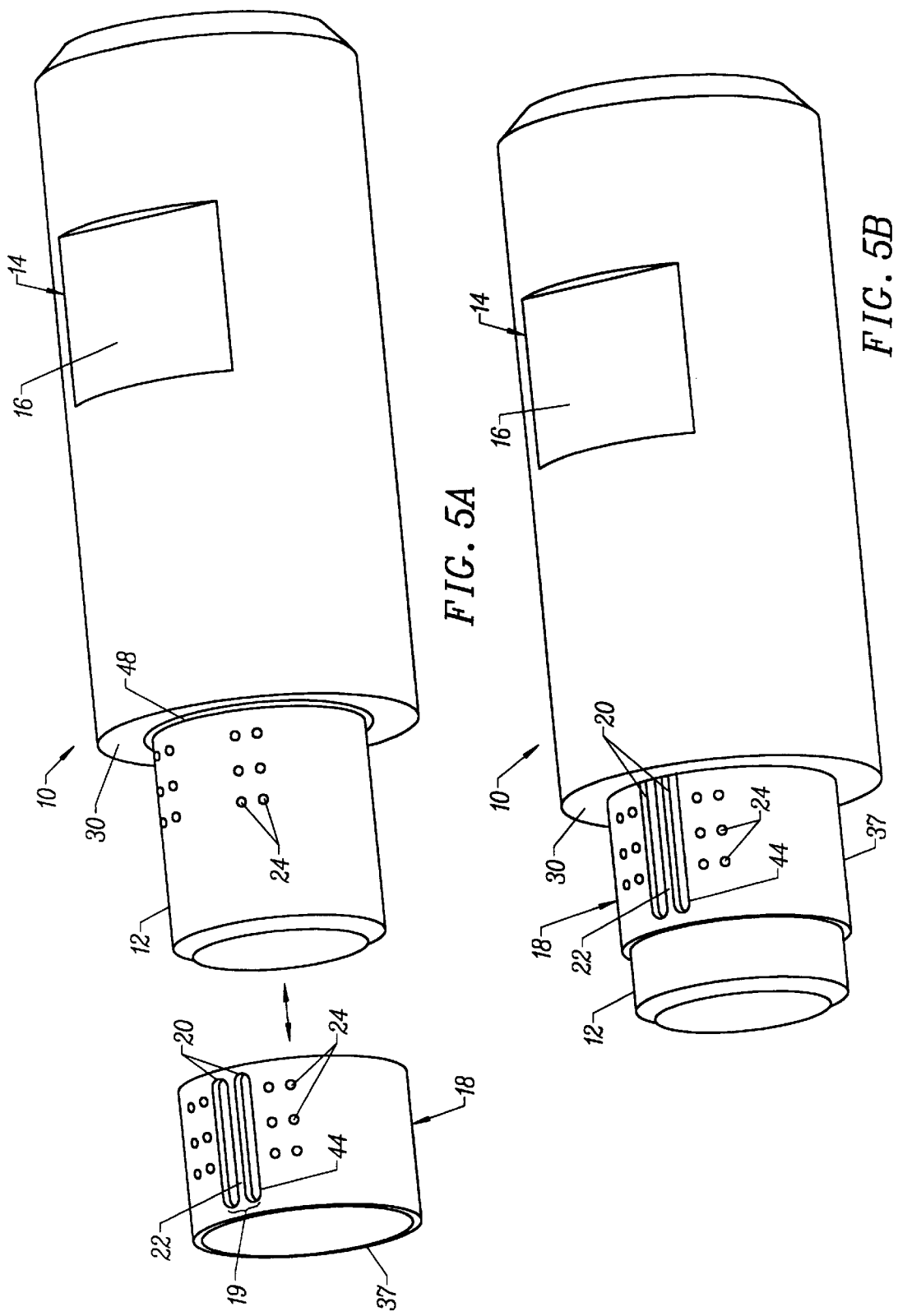

ULTRASOUND WELDING APPARATUS

BACKGROUND OF THE INVENTION

1. Field of the Invention

The present invention relates to an ultrasound welding component for welding an ultrasound weldable material into a loop and more particularly for welding an ultrasound transmitting material into a loop shaped ultrasound transducer.

2. Description of Related Art

Ultrasound welding refers to the technique of using sonic or ultrasonic vibrations to form a weld between ultrasound weldable materials. A typical ultrasound welding system includes an ultrasound welding tool for producing the sonic or ultrasonic vibrations and a surface where the ultrasound weldable materials are positioned. In operation of the system, the ultrasound welding tool is used to compress the ultrasound weldable materials against the surface. This compression generally results in formation of an ultrasound weld between the sections of ultrasound weldable material which were compressed against the surface.

There is a need for improved methods and components for performing ultrasound welding.

SUMMARY OF THE INVENTION

The invention relates to an ultrasound welding component. One embodiment of the component includes a weld region about which an ultrasound weldable material may be wrapped. The weld region includes a weld zone consisting of recesses positioned on opposing sides of a weld area. The recesses and weld area have widths selected such that an ultrasound source compressing overlapping sections of the ultrasound weldable material against the weld area forms a weld having a width which is narrower than a slim of the widths of the recesses and the weld area. The component also includes a mechanism which immobilizes the ultrasound weldable material relative to the weld zone.

The invention also relates to an ultrasound welding apparatus. The ultrasound welding apparatus includes an ultrasound welding component with a weld region about which an ultrasound weldable material may be wrapped. The weld region includes a weld zone consisting of recesses positioned on opposing sides of a weld area. The recesses and weld area each have widths selected such that an ultrasound source compressing overlapping sections of the ultrasound weldable material against the weld area forms a weld having a width which is narrower than a sum of the widths of the recesses and the weld area. The welding component also includes a mechanism which immobilizes the ultrasound weldable material relative to the weld zone. The ultrasound welding apparatus further includes an ultrasound source positionable opposite the weld area.

The invention also relates to a method for forming a weld in an ultrasound weldable material. The method includes providing a welding component having a weld region with a weld zone consisting of recesses positioned on opposing sides of a weld area. The method also includes wrapping the ultrasound weldable material around the weld region with sections of the ultrasound weldable material overlapping one another adjacent to the weld area and contacting the overlapping sections of the ultrasound weldable material with an ultrasound source.

BRIEF DESCRIPTION OF THE FIGURES

FIGS. 2A–2G illustrate a method for using a welding component.

FIG. 2A illustrates a band of material being wrapped around a weld region of a component.

FIG. 2B illustrates a band of material wrapped entirely around a weld region of a welding component.

FIG. 2C is a sideview of a band of material wrapped around a weld region such that one section of the band of material overlaps another section of the band of material.

FIGS. 2D and 2E illustrate overlapping sections of a band of material being contacted with an ultrasound source.

FIG. 2F is sideview of an apparatus which includes a welding component and an ultrasound source.

FIG. 2G illustrates a loop of ultrasound weldable material being removed from the welding component.

FIG. 4A illustrates a welding collar which is removable from an operating end of the welding component.

FIG. 4B illustrates a welding collar having closed recesses.

FIG. 4C illustrates a welding collar having open recesses.

FIG. 5A illustrates a welding component having a receiving trench configured to receive the welding collar.

FIG. 5B illustrates a welding component with a welding collar positioned in a receiving trench.

DETAILED DESCRIPTION

Figure 1A:
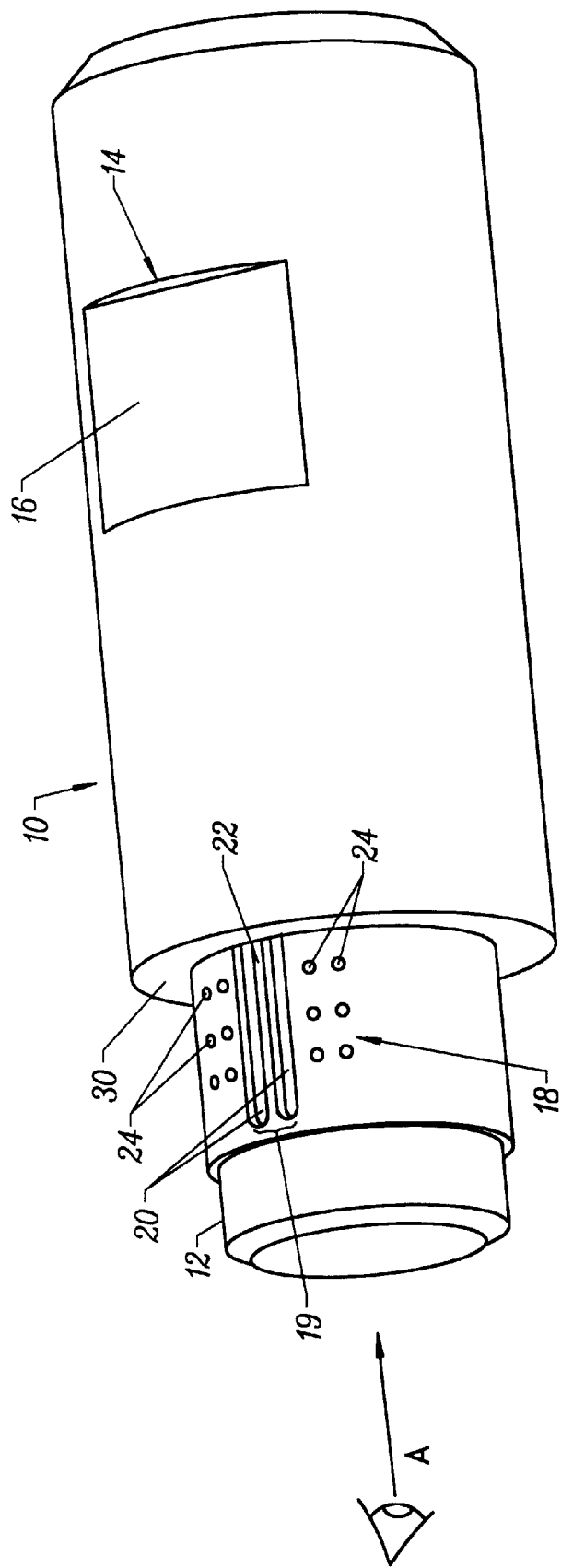
FIG. 1A is a perspective view of a welding component which includes a weld region.

The present invention relates to a welding component and a method for operating the welding component. The welding component includes a weld region with a weld zone consisting of a weld area defined by recesses positioned on opposing sides of the weld area. A piece of an ultrasound weldable material may be wrapped around the weld region such that sections of the ultrasound weldable material overlap one another adjacent to the weld area. The welding component can also include an attachment mechanism for immobilizing the ultrasound weldable material with the overlapping sections adjacent to the weld area.

In operation of the welding component, an ultrasound source is used to compress the overlapping sections against the weld area. This compression can generate sufficient energy to form a weld within the overlapping sections which are adjacent to the weld area. Since the weld is formed in the overlapping sections of the band, the band is formed into a loop.

The recesses on opposing sides of the weld area prevent the ultrasound source from compressing the ultrasound weldable material adjacent the weld area. By using the recesses to limit the amount of material that is compressed, the size of the weld that is formed is controlled. As a result the present invention makes it possible to form smaller welds. For example, the welds formed typically have a width which is smaller than the combined widths of the recesses and the weld area.

The size and shape of weld area and the recesses can also be used to control the geometry of the weld that is formed. For instance, the component of the present invention is ideal for forming a loop of material with a very narrow linear weld. Specifically, a particular welding component can have recesses which define a narrow linear weld area. Because the welding component has a very narrow linear weld area geometry, the resulting weld formed with such a component will have a narrow linear weld shape.

An example of a loop shaped material where a narrow linear weld is desirable is as an ultrasound transducer in a transcription system such as the one described in U.S. patent applicant Ser. No.: 09/273,921, filed Mar. 9, 1999 which is incorporated herein by reference. In the typical transcription system, the ultrasound transducer may be a loop of ultrasound transmitting material encircling a stylus. The ultrasound transducer transmits the ultrasound signals used to track the position of the stylus relative to two or more ultrasound detectors. This tracking is performed by determining the time for the ultrasound signals to travel between the stylus and the ultrasound detectors. Because the loop encircles the stylus, the ultrasound signals emanate from the stylus 360 degrees around the stylus.

The loop shaped ultrasound transducers used with transcription systems are frequently formed by welding together overlapping sections of a band of an ultrasound transmitting material. Unfortunately, a large weld can create non-uniform transmission of ultrasound signals from different positions along the loop. Accordingly, the weld causes non-uniform transmission of ultrasound signals from different positions around the stylus. This non-uniform ultrasound transmission causes the position determined for the stylus to be a function of the angular orientation of the stylus relative to the detectors. Because a stylus is frequently rotated as it is used, this effect is not desirable. However, the effect can be reduced by using the welding component of the present invention to weld a band of an ultrasound transmitting material into a loop having a narrow weld.

One type of ultrasound weldable material which is suitable for use with the present invention is PVDF. PVDF is known to emit ultrasound signals in response to application of a potential. Accordingly, a band of PVDF is ideal for forming the loop shaped ultrasound transducer for a transcription system.

The perimeter of a loop created according to the present inventor can be controlled by selecting the size of the component used. Since the band of material is wrapped around the weld region before the band is welded into a loop, the perimeter of the loop formed are similar to the perimeter of the ultrasound welding component adjacent of the weld region. Accordingly, small perimeter loops can be created with an ultrasound welding component having a weld region with a small perimeter. Since loop shaped ultrasound transducers used with transcription systems frequently have small perimeters, the ultrasound welding component of the present invention is ideal for creation of these small perimeter loops.

FIG. 1A illustrates a welding component 10 according to the present invention. The component includes a rigid body 12 with a mounting region 14 having one or more flat sections 16 for mounting the component 10 in a clamping device. The clamping device can be coupled with the flat sections 16 so as to prevent the component 10 from rotating within the clamping device. Suitable materials for construction of the welding component include, but are not limited to, iron and steel.

The component 10 also includes a weld region 18 about which a band of ultrasound weldable material can be wrapped. The weld region includes a weld zone 19 consisting of a plurality of recesses 20 positioned on opposing sides of a weld area 22. The weld region 18 also includes a plurality of vacuum ports 24 positioned on opposing sides of the weld area 22. The vacuum ports 24 preferably have a diameter between 0.01 and 0.03 inches.

Figure 1B:
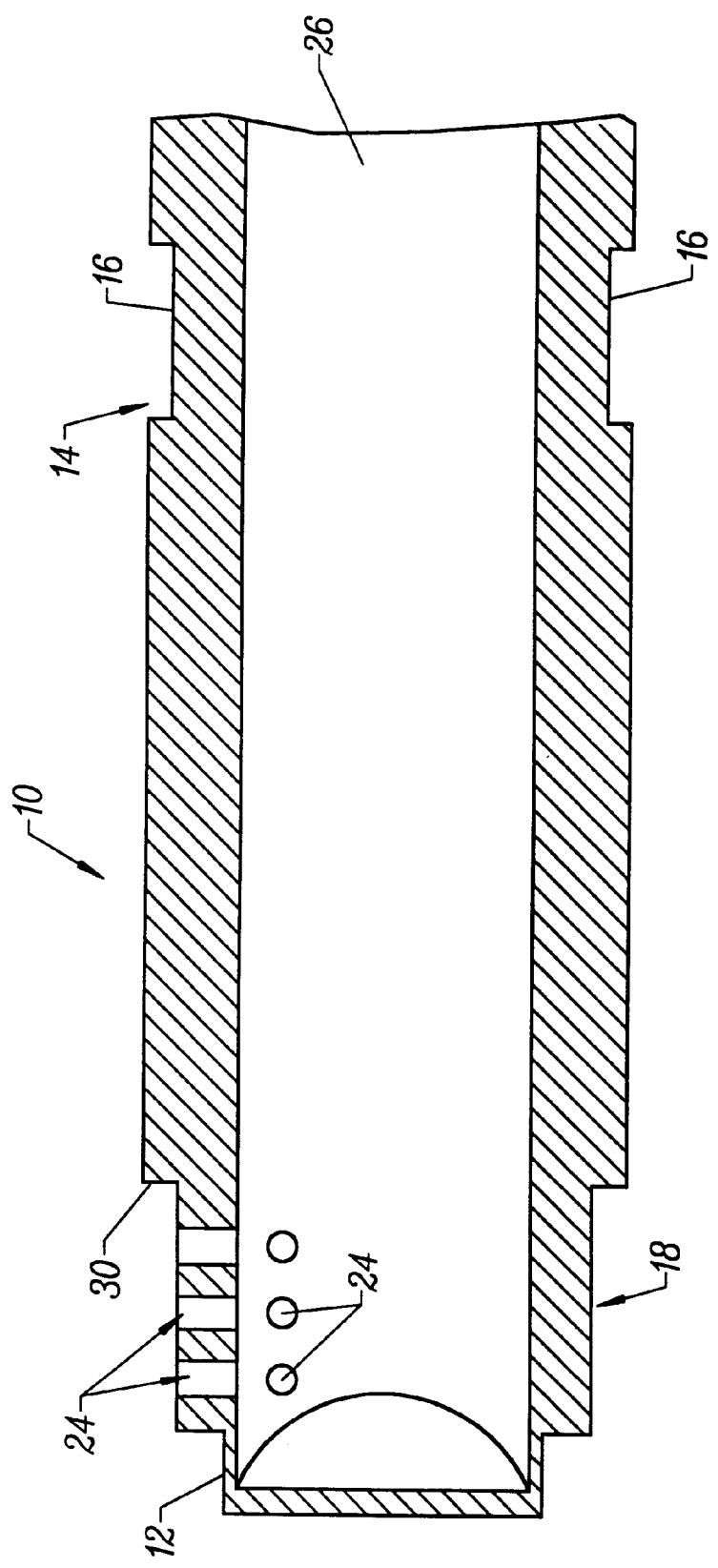
FIG. 1B is a cross section of the welding component illustrated in FIG. 1A.

FIG. 1B is a cross section of the component 10 illustrated in FIG. 1A. The vacuum ports 24 on the weld region 18 are in fluid communication with a lumen 26 extending through the longitudinal length of the component 10. The lumen 26 can be coupled with a vacuum source which can be used to draw a vacuum through the vacuum ports 24. The vacuum pulled through the vacuum ports 24 can be used to immobilize a band of material relative to the weld region 18.

Figure 2A:
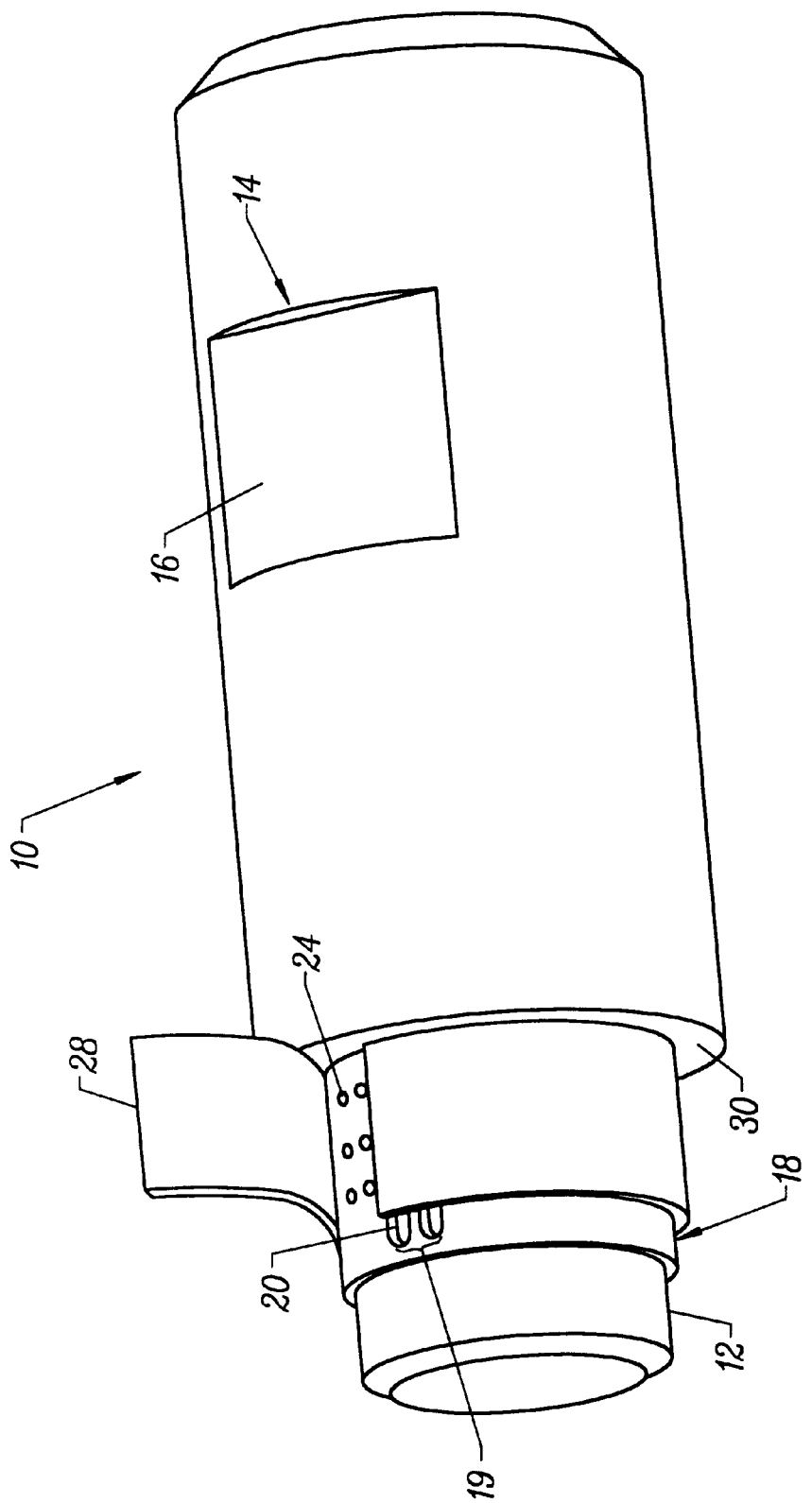

FIGS. 2A–2G illustrate a method for using the component 10. In FIG. 2A a vacuum is drawn through the lumen 26 within the component 10 and a band 28 of ultrasound weldable material is wrapped around the weld region 18 of the component 10. Suitable ultrasound weldable materials include, but are not limited to, PVDF. The band 28 is positioned on the weld region 18 so a section of the band 28 extends over the weld area 22. The band 28 is then wrapped around the weld region 18 so the band 28 covers the vacuum ports 24 positioned to one side of the weld area 22. The vacuum pulled through the vacuum ports 24 immobilizes the band 28 relative to the weld area 22. As the band 28 is wrapped around the weld region 18, the band 28 is kept in contact with a weld region edge 30 to ensure correct placement of the band 28 relative to the weld region 18.

As illustrated in FIG. 2B, the band 28 is eventually wrapped around the weld region 18 so it covers the vacuum ports 24 on both sides of the weld area 22. The vacuum pulled through the vacuum ports 24 immobilizes the band 28 relative to the weld region 18. Although the vacuum ports 24 serve as an attachment mechanism in FIGS. 2A and 2B, other attachment mechanisms can be used with the component 10. Other suitable attachment mechanisms include, but are not limited to, electrostatic mechanisms, releasable adhesives, contact strips, and other high friction materials. The attachment mechanism can also be a function of the material to be welded. For instance, when the material has a metal component 10, the attachment mechanism can be magnets positioned around the weld zone 18. Once the band 28 is wrapped around the weld region 18, the band 28 can be manipulated to move as much of the band 28 as possible into contact with the weld region edge 30. The proximity of the band 28 to the weld region edge 30 helps to ensure consistent placement of each band 28 relative to the weld region 18.

FIG. 2C is a sideview of the component 10 looking down the longitudinal axis of the component 10 of FIG. 2B as illustrated by the arrow labeled A. Sections of the band 28 overlap one another adjacent to the weld area 22. Similarly, sections of the band 28 overlap one another adjacent to the recesses 20.

Figures 2D, 2E:
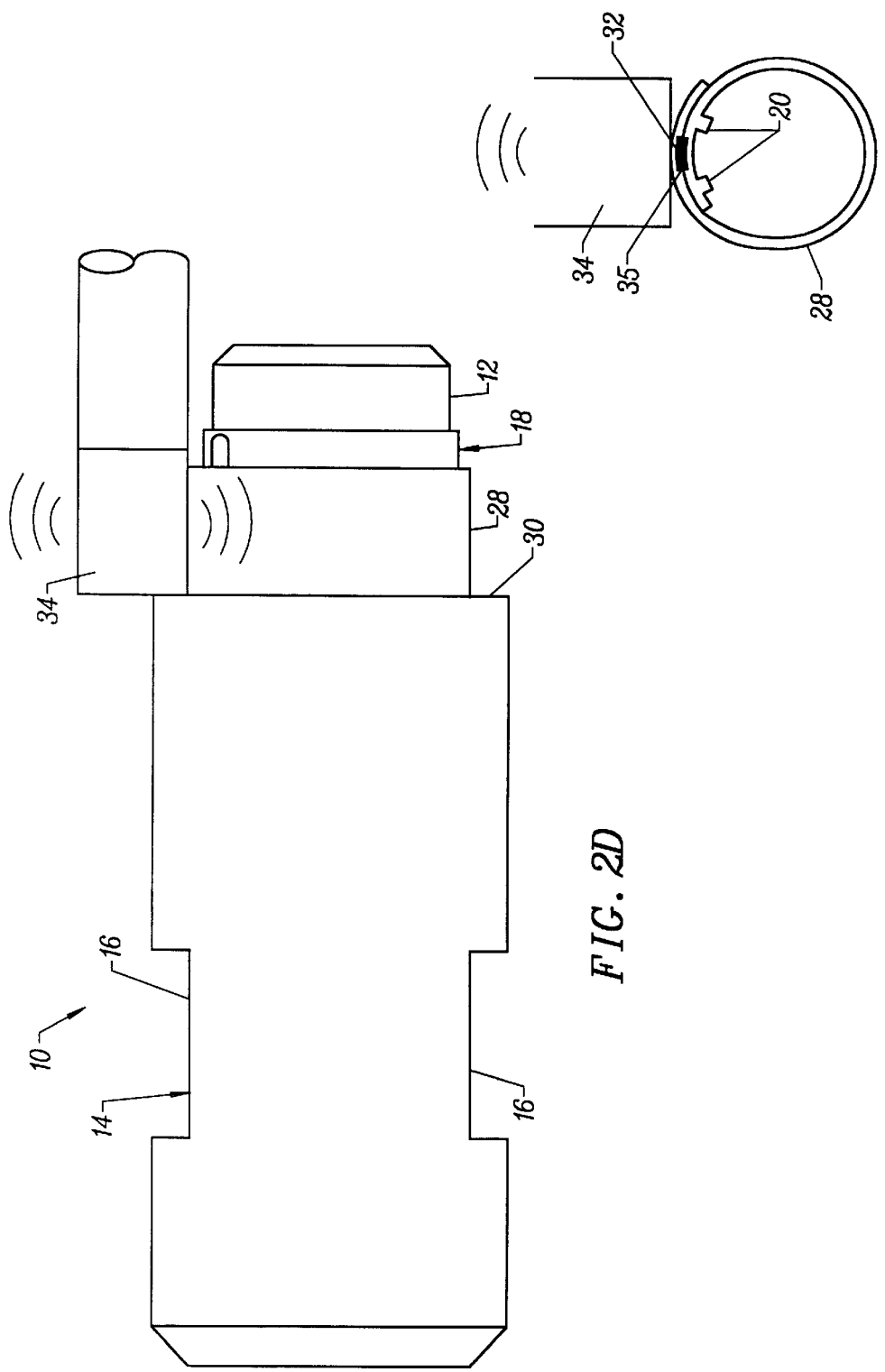

FIGS. 2D and 2E illustrate an ultrasound source 34 compressing overlapping sections of the band 28 which are adjacent to the weld area against the weld area. The weld area 22 supports the adjacent overlapping sections of the band 28 during the compression. This support creates a pinch point 32 at the closest point between the ultrasound source 34 and the weld area 22. The maximum compression occurs at this pinch point 32 and decreases moving away from the pinch point 32. The compression generates enough energy within and around the pinch point 32 to form a weld 35 within the overlapping sections of the band 28 which are adjacent to the weld area 22.

As described above, overlapping sections of the band 28 are also positioned adjacent to the recesses 20. The size of the recesses 20 are selected to reduce the support provided to the adjacent overlapping sections during compression of the overlapping sections adjacent to the weld area 22. The reduced support yields a reduced amount of energy generation within the overlapping sections adjacent to the recesses 20 as compared to the energy generation within the overlapping sections adjacent to the weld area 22. The reduced energy generation limits the formation of the weld 35 within the overlapping sections which are adjacent to the recesses 20. As a result, the weld 35 is primarily formed in the overlapping sections which are adjacent to the weld area 22 although portions of the weld 35 can be formed in the overlapping sections adjacent to the recesses 20. Because the weld 35 is primarily formed in the overlapping sections adjacent to the weld area 22, the weld 35 has a geometry which is similar to the geometry of the weld area 22.

The geometry of the weld area 22 can be altered in order to alter the geometry of the weld 35. For instance, when the component 10 is used to form a band 28 of ultrasound transmitting material into a loop shaped ultrasound transducer for use with a transcription system, the weld 35 is preferably small to prevent the weld 35 from affecting the transmitting characteristics of the ultrasound transmitting material. The small weld is provided by using a welding component 10 with a narrow weld area 22.

Figure 2F:
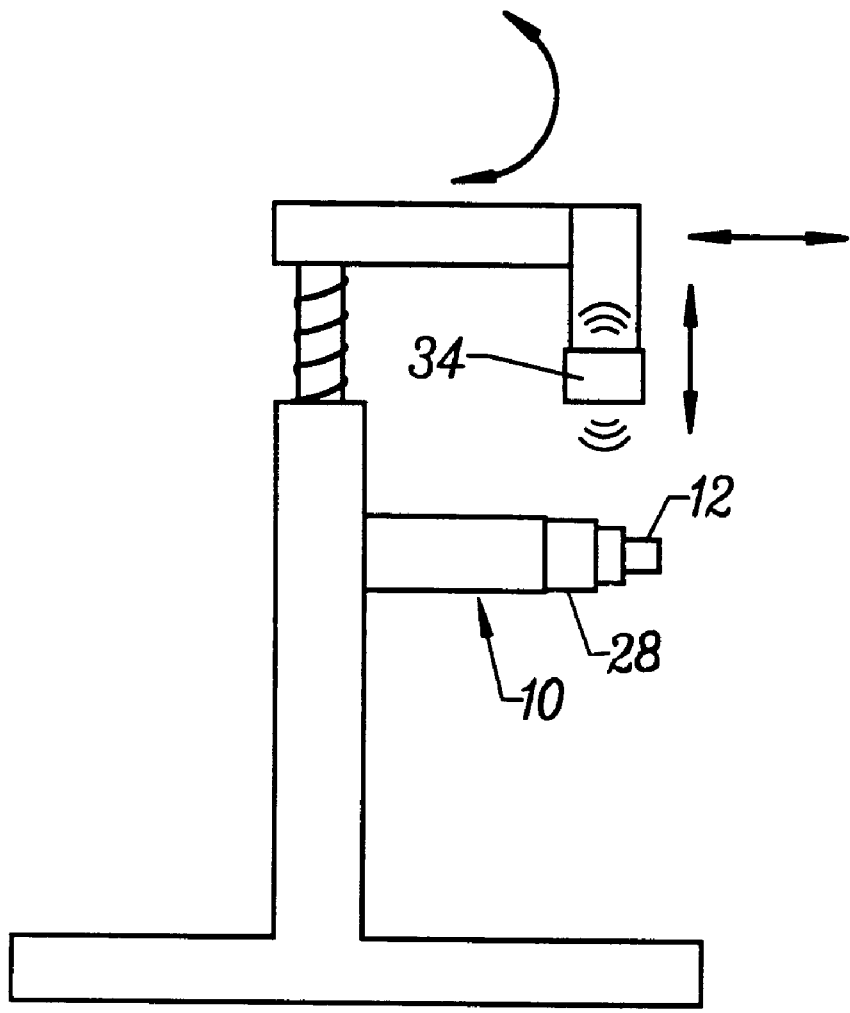

Suitable ultrasound sources 64 include, but are not limited to, an ultrasound hammer configured to vibrate at 20, 40, and 60 kHz. As illustrated, the direction of vibration is preferably perpendicular to the plane of the band 28 at the pinch point 32. The ultrasound source 34 can be handheld. Alternatively, an ultrasound welding apparatus can have a structure which includes both the ultrasound source 34 and the component 10 as illustrated in FIG. 2F. The structure is designed so the ultrasound source 34 can be mechanically moved relative to the band 28 of ultrasound weldable material. Accordingly, the ultrasound source 34 can be moved into and out of contact with the band 28 of material with the force, direction and duration required to form the ultrasound weld 35. The apparatus can be computer controlled to minimize the amount of operator error associated with creating the weld 35.

Once the weld 35 has been formed in a band 28 of ultrasound weldable material, the loop can be removed from the weld region 18 as illustrated in FIG. 2G. The loop can have one or more tag ends 86 extending beyond the weld. These tag ends can be removed with a cutting technique which is appropriate for the ultrasound weldable material. Preferably, the length of the material is selected such that tag ends are not formed, thereby obviating a removal step.

Figure 3:
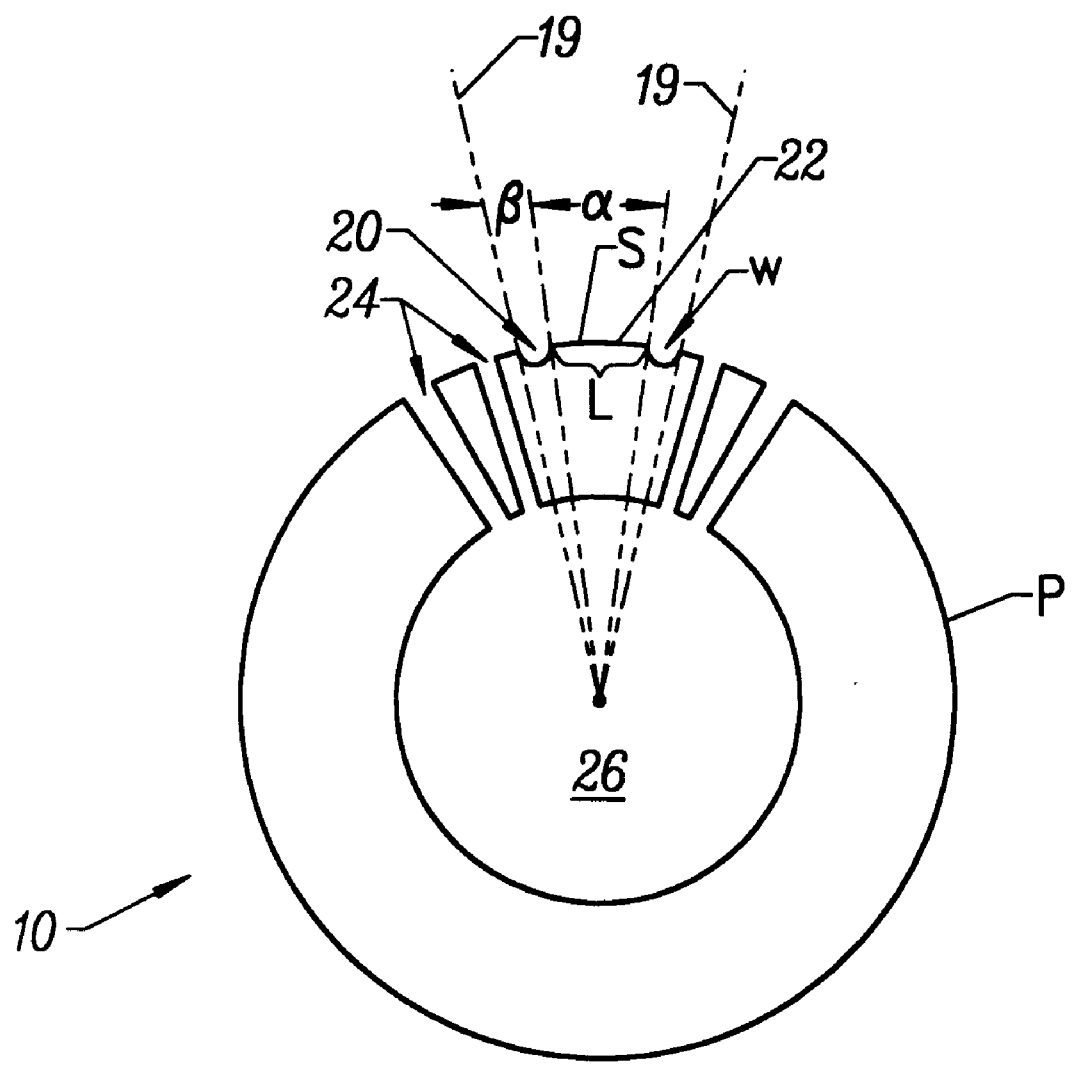
FIG. 3 is a cross section of a welding component looking along the longitudinal axis of the welding component.

As described, the features of the weld region 18 are selected so the weld has a geometry which is similar to the geometry of the weld area. FIG. 3 illustrates the features of the weld region in a cross sectional view of a component 10 looking down the longitudinal length of the component 10 at the point labeled A in FIG. 1. The weld region has a perimeter labeled P. When the component 10 is used to form a band of ultrasound transmitting material into a loop shape ultrasound transducer for use with a transcription system, the perimeter of the weld region is preferably less than 1.75 inches, more preferably between 0.75 and 1.75 inches, and most preferably between 1 and 1.75 inches.

As illustrated in FIG. 3, the weld area has a surface 36 labeled S. The surface 36 is preferably curved. Examples of curved surfaces include, but are not limited to, elliptical and circular.

The weld area may have an angular width labeled $\alpha$. An increased angular width $\alpha$ results in an increased weld area 22 and accordingly a wider weld. When the component 10 is used to form a loop shaped ultrasound transducer for use with a transcription system, the angular width, $\alpha$, is preferably less than about 0.1 degrees and more preferably between about 0.01 and 0.1 degrees and most preferably between about 0.03 and 0.06 degrees. Similarly, the weld area can also have an width labeled $W_{WA}$. When the component 10 is used to form a loop shaped ultrasound transducer for use with a transcription system, the width $W_{WA}$ is preferably less than 0.03 includes, preferably between 0.005 and 0.03 inches and more preferably between 0.005 and 0.015 inches. When a very narrow weld is desired, the width of the weld area, $W_{WA}$, is decreased.

The recesses 20 have an angular width labeled $\beta$. When the component 10 is used to form a loop shape ultrasound transducer for use with a transcription system, the angular width, $\beta$, is preferably less than about 0.3 degrees, more preferably between 0.1 and 0.3 degrees, most preferably 0.25 degrees. The recesses also have a width labeled $W_R$. When the component 10 is used to form a loop shape ultrasound transducer for use with a transcription system, the width, $W_R$, is preferably less than about 0.05 inches, more preferably between 0.02 and 0.05 inches, and most preferably between 0.02 and 0.04 inches.

The weld region 18 can be integral with the rigid body 12 or can be included on a welding collar 37 which slides over the rigid body 12 as illustrated in FIG. 4A. The rigid body 12 can also include vacuum ports 24. These vacuum ports 24 are aligned with the vacuum ports 24 on the welding collar 37 when the welding collar 37 is positioned on the rigid body 12.

Once a desired position of the welding collar 37 relative to the rigid body 12 has been achieved, a fastener, such as a set screw 38, can be engaged to retain the welding collar 37 in place on the rigid body 12. An alternative fastener can include complementary threads on both the welding collar 37 and the rigid body 12. These complementary threads can be used to screw the welding collar 37 on and off the rigid body 12.

When the weld region 18 is included in a welding collar 37 the recesses 20 can be indentations in the welding collar 37 or can be apertures extending through the welding collar 37. Because the recesses 20 can be formed in the welding collar 37, the recesses 20 do not need to be formed in the rigid body 12. As a result, a number of different welding collars 37 can be used with a single rigid body 12. These welding collars 37 can have different perimeters for forming loops of different sizes. Further, different welding collars 37 can have weld areas 22 with different sizes. Since the weld formed with the component 10 has a geometry which is similar to the geometry of the weld area 22, a single rigid body 12 can be used with different welding collars 37 to provide different geometry welds.

Positioning a welding collar 37 on the rigid body 12 causes an abutting side 40 of the welding collar 37 to abut the weld region edge 30. The welding collar 37 can have closed recesses 44 as illustrated in FIG. 4B or can have open recesses 46 which are open on the abutting side 40 of the welding collar 37 as illustrated in FIG. 4C. The open recesses 46 permit the weld area 22 to abut the weld region edge 30. As a result, the straight shape of the weld area 22 is retained and is consistent at the intersection of the weld area 22 and the weld region edge 30.

An alternative component 10 which can be used to provide a weld area 22 with a consistent shape adjacent to the weld region edge 30 is illustrated in FIGS. 5A and 5B. The weld region edge 30 includes a receiving trench 48 configured to receive the abutting side 40 of a welding collar 37 positioned on the rigid body 12. When the welding collar 37 includes closed recesses 44, the receiving trench 48 can be deep enough to engulf the closed ends as illustrated in FIG. 5B. Enclosure of these ends allows the weld area 22 to maintain a geometry adjacent to the weld region edge 30 which is consistent with the geometry of the remaining portions of the weld area 22.

Figure 6A:
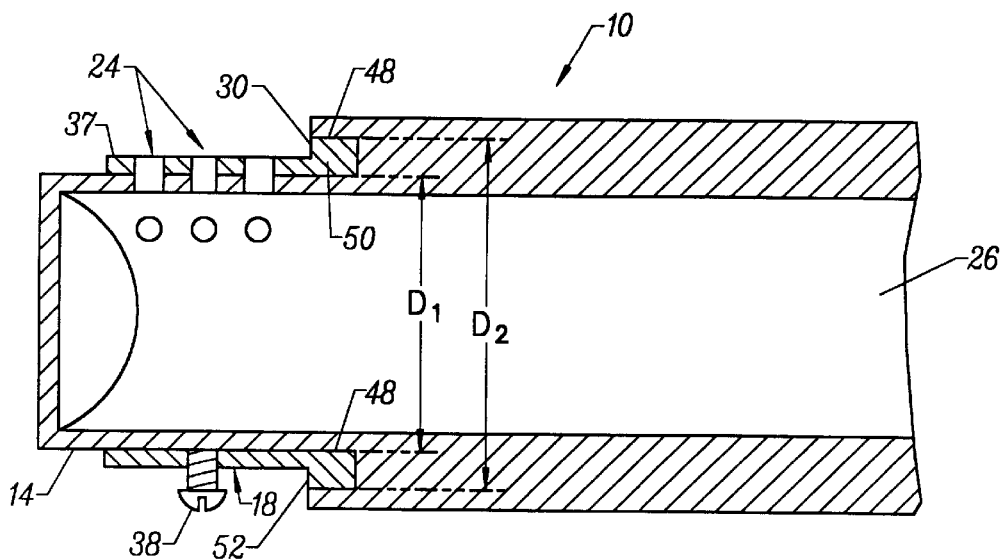
FIG. 6A is a cross section of a welding component having a receiving trench and a welding collar having a coupling side positioned within the receiving trench.

FIG. 6A provides a cross section of a component 10 with a welding collar 37 positioned on the rigid body 12. The abutting side 40 of the welding collar 37 has a coupling side 50 with a geometry which is complementary to the geometry of the receiving trench 48. These complementary geometries permit the coupling side 50 to be positioned within the receiving trench 48. The coupling side 50 can have an external side 52 which sits flush with the weld region edge 30 when the coupling side 50 is positioned within the receiving trench 48. As a result, the external side 52 of the coupling side 50 becomes a part of the weld region edge 30.

Figure 6B:
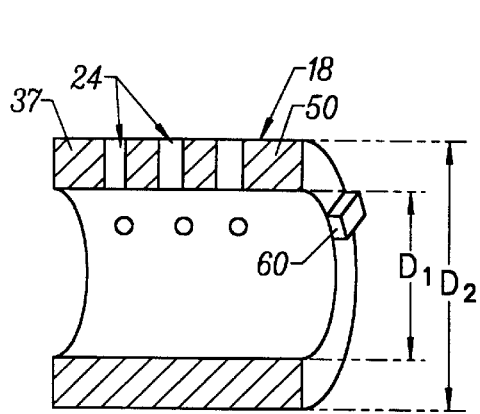
FIG. 6B is a cross section of the welding collar having a weld zone and a coupling side. The outer diameter of the coupling side is the same size as the diameter of the weld zone.
Figure 6C:
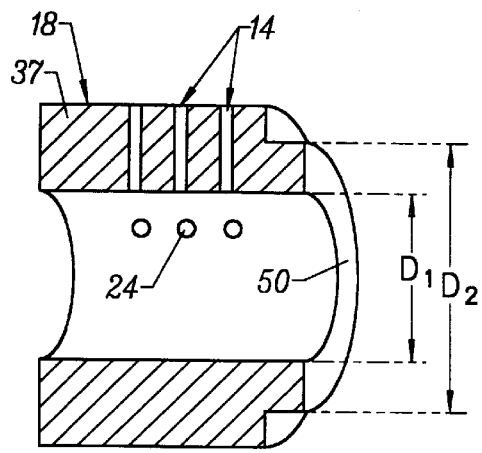
FIG. 6C is a cross section of the welding collar having a weld zone and a coupling side. The outer diameter of the coupling side is smaller than the diameter of the weld zone.

FIGS. 6B and 6C illustrate additional welding collar 37 embodiments. The coupling sides 50 illustrated in FIG. 6A, 6B and 6C each have the same sized inner diameter DI and the same sized outer diameter $D_2$, while the weld regions 18 on each welding collar 37 have different diameters. Because the coupling sides 50 have the same dimensions and the coupling side 50 is positioned within the receiving trench 48, each welding collar 37 can be used with the same rigid body 12. As a result, the coupling sides 50 allow welding collars 37 with different sized weld regions 18 to be used with a single rigid body 12.

To encourage consistent positioning of the welding collar 37 relative to the rigid body 12, the welding collar 37 and rigid body 12 can include one or more alignment mechanisms. For instance, the welding collar 37 can include one or more tabs 60 as illustrated in FIG. 6B. The welding collar 37 can include holes (not illustrated) which are complementary to the tabs 60. When the welding collar 37 is positioned on the rigid body 12 the welding collar 37 can be rotated until the tabs 60 fit into the holes. The welding collar 37 will not be received within the receiving trench 48 until the welding collar 37 has a particular angular orientation relative to the rigid body 12. As a result, each time a particular welding collar 37 is used with a particular rigid body, the welding collar 37 will be positioned on the rigid body 12 with a consistent angular orientation. This angular orientation can ensure alignment between vacuum ports 24 on the welding collar 37 and vacuum ports 24 on the weld region 18.

Although the above discussion discloses weld areas which are straight, the weld area 22 can have any number of geometries including curved, zig-zagged and other irregular geometries. In addition, the component 10 is not limited to welding pieces of material into loops as discussed above. For instance, the component 10 can be used to weld two different pieces of material together. Further, the components, apparatuses and methods according to the present invention can be used to form ultrasound welds in materials to be used in applications other than ultrasound transducers and transcription systems.

EXAMPLE 1

An ultrasound welding component having a cylindrically shaped weld region with a radius of 0.225 inches was used in conjunction with a 40 kHz ultrasound hammer to weld a band of PVDF into an loop shaped ultrasound transducer. The welding component had a weld area with a width of 0.1 inches (0.05 degrees) and recesses on opposing sides of the weld area with a width of 0.3 inches (0.15 degrees). The ultrasound hammer was used to compress overlapping sections of the PVDF band against the weld area for 0.3 seconds to produce a loop of PVDF material having a weld with a width of about 0.1 inches.

While the present invention is disclosed by reference to the preferred embodiments and examples detailed above, it is to be understood that these examples are intended in an illustrative rather than limiting sense, as it is contemplated that modifications and combinations will readily occur to those skilled in the art, which modifications and combinations will be within the spirit of the invention and the scope of the appended claims.

What is claimed is:

1. A method for forming a weld in an ultrasound weldable material comprising:

providing a welding component having a weld region with a weld zone consisting of recesses positioned on opposing sides of a weld area;

wrapping the ultrasound weldable material around the weld region with sections of the ultrasound weldable material overlapping one another adjacent to the weld area; and contacting the overlapping sections of the ultrasound weldable material with an ultrasound source.

2. The method of claim 1, wherein the recesses and weld area have widths selected such compressing the overlapping sections of the ultrasound weldable material against the weld area forms a weld with a width which is narrower than a sum of the widths of the recesses and the weld area.

3. The method according to claim 1, wherein the ultrasound weldable material is a band of PVDF.

4. The method according to claim 1, further comprising immobilizing the ultrasound weldable material relative to the weld area.

5. The method according to claim 3, wherein immobilizing the ultrasound weldable material relative to the weld area includes creating a vacuum through a plurality of vacuum ports in the ultrasound weld zone.

6. The method according to claim 1, further comprising: attaching a welding collar which includes the ultrasound weld zone on a weld region before positioning the ultrasound weldable material around the ultrasound weld zone.

7. An ultrasound welding component, comprising:

a weld region about which an ultrasound weldable material may be wrapped, the weld region including a weld zone consisting of recesses positioned on opposing sides of a weld area, the recesses and weld area each having widths selected such that an ultrasound source compressing overlapping sections of the ultrasound weldable material against the weld area forms a weld having a width which is narrower than a sum of the widths of the recesses and the weld area.

8. The ultrasound welding component according to claim 7, wherein the component further includes a mechanism which immobilizes the ultrasound weldable material relative to the weld zone.

9. The ultrasound welding component according to claim 7, wherein the weld area has a curved surface with a radius of less than 1 inch.

10. The ultrasound welding component according to claim 7, wherein the weld area has a curved surface with a radius of between about 0.05 and 1 inch.

11. The ultrasound welding component according to claim 7, wherein the width of the weld area is an angular width of less than about 0.1 degrees.

12. The ultrasound welding component according to claim 7, wherein the width of the weld area is an angular width between about 0.01 and 0.1 degrees.

13. The ultrasound welding component according to claim 12, wherein the widths of the first and second recesses have linear widths of at least about 0.3 inches.

14. The ultrasound welding component according to claim 12, wherein the width of the weld area is between about 0.05 and 0.3 inches.

15. The ultrasound welding component according to claim 7, wherein a portion of the weld region about which the ultrasound weldable material may be wrapped has a perimeter of less than about 1.75 inches.

16. The ultrasound welding component according to claim 7, wherein a portion of the weld region about which the ultrasound weldable material may be wrapped has a perimeter between about 0.75 and 1.75 inches.

17. The ultrasound welding component according to claim 7, wherein the mechanism which immobilizes the ultrasound weldable material relative to the weld zone is selected from the group consisting of vacuum ports, electrostatic charge mechanism, adhesive and magnetic.

18. The ultrasound welding component according to claim 7, wherein the attachment mechanism is included on a weld region and the weld zone is defined on a welding collar which is detachable from the weld region.

19. The ultrasound welding component according to claim 18, wherein the weld region includes a receiving trench configured to receive a portion of the welding collar.

20. The ultrasound welding component according to claim 18, wherein the welding collar includes a fastener for immobilizing the welding collar relative to the weld region.

21. The ultrasound welding component according to claim 18, wherein the welding collar and weld region include one or more alignment mechanisms to encourage consistent positioning of the welding collar relative to the weld region.

22. An ultrasound welding apparatus, comprising:
a weld region about which an ultrasound weldable material may be wrapped, the weld region including a weld zone consisting of recesses positioned on opposing sides of a weld area, the recesses and weld area each having widths selected such that an ultrasound source compressing overlapping sections of the ultrasound weldable material against the weld area forms a weld having a width which is narrower than a sum of the widths of the recesses and the weld area;
a mechanism which immobilizes the ultrasound weldable material relative to the weld zone; and
an ultrasound source positionable opposite the weld area.

23. The ultrasound welding component according to claim 22, wherein the component further includes a mechanism which immobilizes the ultrasound weldable material relative to the weld zone.

24. The ultrasound welding component according to claim 22, wherein the weld area has a curved surface with a radius of less than 1 inch.

25. The ultrasound welding component according to claim 22, wherein the weld area has a curved surface with a radius of between about 0.05 and 1 inch.

26. The ultrasound welding component according to claim 22, wherein the width of the weld area is an angular width of less than about 0.1 degrees.

27. The ultrasound welding component according to claim 22, wherein the width of the weld area is an angular width between about 0.01 and 0.1 degrees.

28. The ultrasound welding component according to claim 27, wherein the widths of the first and second recesses have linear widths of at least about 0.3 inches.

29. The ultrasound welding component according to claim 27, wherein the width of the weld area is between about 0.05 and 0.3 inches.

30. The ultrasound welding component according to claim 22, wherein a portion of the weld region about which the ultrasound weldable material may be wrapped has a perimeter of less than about 1.75 inches.

31. The ultrasound welding component according to claim 22, wherein a portion of the weld region about which the ultrasound weldable material may be wrapped has a perimeter between about 0.75 and 1.75 inches.

32. The ultrasound welding component according to claim 22, wherein the mechanism which immobilizes the ultrasound weldable material relative to the weld zone is selected from the group consisting of vacuum ports, electrostatic charge mechanism, adhesive and magnetic.

33. The ultrasound welding component according to claim 22, wherein the attachment mechanism is included on a weld region and the weld zone is defined on a welding collar which is detachable from the weld region.

34. The ultrasound welding component according to claim 33, wherein the weld region includes a receiving trench configured to receive a portion of the welding collar.

35. The ultrasound welding component according to claim 33, wherein the welding collar includes a fastener for immobilizing the welding collar relative to the weld region.

36. The ultrasound welding component according to claim 33, wherein the welding collar and weld region include one or more alignment mechanisms to encourage consistent positioning of the welding collar relative to the weld region.

37. The ultrasound welding apparatus according to claim 22, wherein the ultrasound source is an ultrasound hammer.

* * * * *